Sept. 22, 1959  H. E. KIMES  2,904,878
APPARATUS FOR MOUNTING INSERTS IN TIRE MOLDS
Filed Oct. 19, 1955
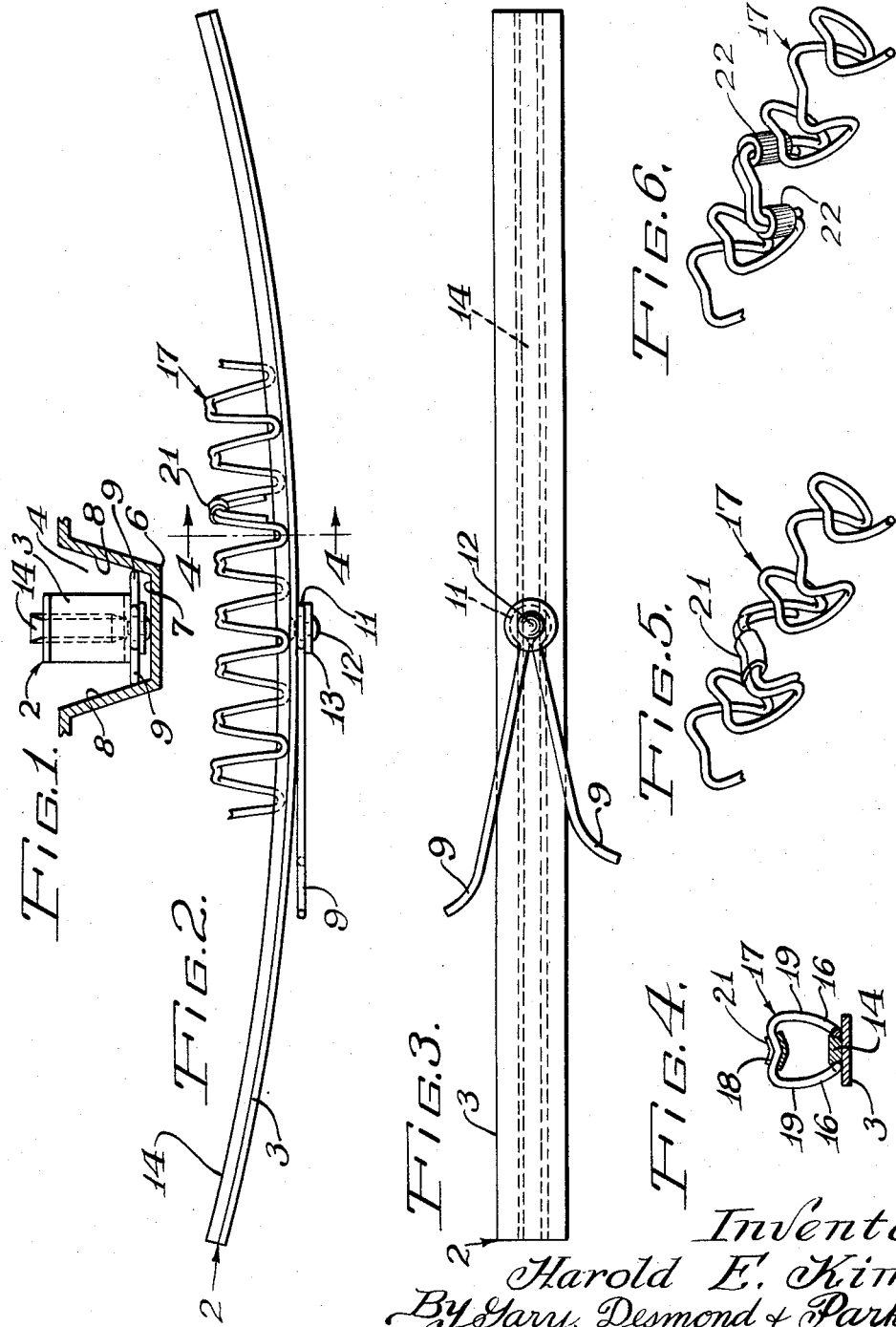
Inventor:
Harold E. Kimes
By Gary, Desmond & Parker
Attys.

United States Patent Office 2,904,878
Patented Sept. 22, 1959

2,904,878

APPARATUS FOR MOUNTING INSERTS IN TIRE MOLDS

Harold E. Kimes, Freeport, Ill., assignor to Harold E. Kimes Corporation, Freeport, Ill., a corporation of Illinois Application October 19, 1955, Serial No. 541,341

3 Claims. (Cl. 29—283)

This invention relates to an apparatus for mounting a chain of metallic inserts within a tread groove of a mold matrix during the forming of a nonskid tire.

In the manufacture of tires having metallic inserts embedded within the tread thereof, it is first necessary to position the inserts within a mold matrix. The present invention is concerned with mounting a chain of generally U-shaped inserts within the annular tread groove of a mold matrix and for interconnecting the ends of the chain of inserts to form a ring of inserts. The ends of the chain of inserts may be interconnected by metallic clips, as hereinafter described, or by members formed of partially vulcanized tread stock, as set forth in my copending patent application Serial No. 523,016, filed July 19, 1955, now abandoned. The chain of inserts may, for example, be of one of the types disclosed in my Patent No. 2,600,506, granted June 17, 1952.

Briefly, the present invention contemplates the provision of a guide member adapted to be detachably mounted within an annular tread groove of a mold matrix to receive and align the ends of a chain of inserts enclosed within the groove. After the ends of the chain of inserts have been secured together by means of a metallic clip to form a continuous ring of inserts, the guide member is removed from the matrix and the tread stock with the inserts embedded therein is applied to a tire casing.

An object of the present invention resides in the provision of a simple and inexpensive method and apparatus for mounting a ring of metallic inserts within a tire mold matrix.

A further object of the invention resides in the provision of a guide member adapted to hold the ends of a chain of inserts in alignment during application of a clip thereto to form a continuous ring of inserts.

The invention embodies other novel features, details of construction and arrangement of parts which are hereinafter set forth in the specification and claims and illustrated in the accompanying drawing, wherein:

Fig. 1 is an end elevational view illustrating a guide member embodying features of the invention, the member being shown as mounted within an annular groove of a tire mold matrix.

Fig. 2 is a side elevational view of the guide member, showing a chain of wire inserts mounted thereon.

Fig. 3 is a bottom plan view of the guide member.

Fig. 4 is a transverse sectional view taken along the line 4—4 of Fig. 2, showing the manner in which a chain of generally U-shaped wire inserts is detachably mounted upon the guide member to facilitate joining of the ends of the chain to form a continuous ring of inserts.

Fig. 5 is a detail perspective view illustrating the ends of a chain of wire inserts joined together by means of a metallic clip.

Fig. 6 is a detail perspective view illustrating the ends of a chain of wire inserts joined together by means of lengths of resilient tubing.

Referring now to the drawing for a better understanding of the invention, the guide member 2 is shown as comprising an arcuate base 3 formed from a length of strip metal for mounting within an annular tread groove 4 of a tire mold matrix 6, the radius of the base substantially corresponding to the radius of the annular inner surface 7 of the groove. The inner surface 7 merges with annular axially spaced side surfaces 8—8 to define the groove 4.

To centrally position the guide member 2 between the side surfaces 8—8 of the annular groove 4, resilient wire fingers 9—9 are secured to the base 3 and project outwardly from opposite sides thereof for engagement against their respective side surfaces 8—8. If desired, the fingers 9—9 may be formed from a single length of wire to provide a connecting loop portion 11 to receive a rivet 12 mounted on the base 3, a washer 13 being mounted on the rivet to secure the loop portion in fixed position against the outer surface of the base.

A guide rib 14 extends centrally along the inner side of the base 3 and is secured thereto by suitable means such as spot welds, rivets, etc. The guide rib is formed to provide side surfaces 16—16 converging toward the inner surface of the base to define therewith spaced recesses.

The chain of inserts to be embedded within the tread of a tire is shown as formed from a length of wire to provide generally U-shaped inserts 17, each having a curvilinear base 18 and arcuate arms 19—19. The ends of the arms of each insert are jointed to the ends of the arms of adjacent inserts to form a chain of inserts adapted to be embedded within a tire tread, the inserts being separated from each other by breakage of their junctures during use of the tire on a vehicle.

To form the chain of inserts into a ring of inserts for embedding with a tire tread, the inserts at opposite ends of the chain are joined together by a metallic clip 21 embracing the base portions 18 of the end inserts, as illustrated in Figs. 2 and 4. The clip 21 is shown as comprising a length of strip metal which, if desired, may first be bent generally U-shape to straddle the base portions 18 of the adjacent end inserts and then gripped between the jaws as pliers or other tool to form the clip into a ring encircling the base portions.

As the tire wire is distributed to users on reels, it must be cut to desired lengths for insert in a mold matrix groove. To facilitate mounting of the length of tire wire in a mold matrix groove and then joining the ends of the wire together to form a ring, the guide member 2 is first mounted in the matrix groove 7 with the ends of the resilient fingers 9—9 engaging the side surfaces 8—8 of the groove.

The inserts 17 along one end of the length of tire wire are then mounted along one end of the guide member 2, and the inserts along the other end of the tire wire are mounted on the other end of the guide member, as illustrated in Fig. 2, to dispose the end inserts in side-by-side abutting engagement. The clip 21 is then clamped around the base portions of the abutting end inserts to form a ring of inserts, and the guide member is disengaged from the matrix and ring of inserts. The ring of inserts is then embedded within a tire tread in the conventional manner.

Fig. 6 in the drawing illustrates a modified form of the invention in which the end inserts in a length of tire wire are joined together along their arcuate leg portions by means of a pair of tubular members 22 adapted to be formed of resilient tread stock, the tubular members being sleeved over the leg portion and snugly embracing same.

I claim:

1. A tool separate from a mold for mounting a chain of generally U-shaped inserts within a mold matrix groove, comprising an elongated segmental arcuate guide member having a guide rib secured to a relatively wide base, said guide rib being continuous and substantially coextensive in length with said guide member, the sides of said rib converging toward said base, said guide member having a radius of curvature substantially equal to the radius of curvature of a tire matrix groove, resilient means mounted on said guide member adapted to engage the opposed side wall surfaces of a matrix groove, said resilient means comprising a length of wire bent intermediate its ends to provide legs connected by a loop portion, and means including a rivet and a washer to secure said loop portion to said guide member.

2. A tool separable from a mold for mounting a chain of generally U-shaped inserts within a mold matrix groove, comprising an elongated segmental arcuate guide member having a guide rib substantially coextensive in length with said member secured to a relatively wide base, the sides of said rib converging toward said base, said guide member having a radius of curvature substantially equal to the radius of curvature of a tire matrix groove, and resilient means comprising a pair of flexible diverging arms mounted on that side of said guide member opposite the guide rib for engaging the opposed side wall surfaces of a matrix groove.

3. A tool separable from a mold for mounting a chain of generally U-shaped inserts within a mold matrix groove, comprising an elongated segmental arcuate guide member having a guide rib substantially coextensive in length with the length of said member, said guide rib being secured to a relatively wide base, the sides of said rib converging toward said base, said guide member having a radius of curvature substantially equal to the radius of curvature of a tire matrix groove, and resilient means mounted on the side of said guide member opposite said guide rib for engaging the opposed side wall surfaces of a matrix groove, said resilient means comprising a length of wire bent intermediate its ends to provide legs connected by a loop portion, said legs extending generally in the same direction relative to the guide member, and means to secure said loop portion to said guide member.

References Cited in the file of this patent
UNITED STATES PATENTS

| | | |
|---|---|---|
| 2,591,430 | Hawkinson | Apr. 1, 1952 |
| 2,598,791 | Hawkinson | June 3, 1952 |
| 2,722,717 | Kimes | Nov. 8, 1955 |